(12) United States Patent
Gasparakis (10) Patent No.: US 9,313,119 B2
(45) Date of Patent: Apr. 12, 2016

(54) NETWORK ROUTING BASED ON RESOURCE AVAILABILITY

(75) Inventor: Iosif Gasparakis, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/995,978

(22) PCT Filed: May 10, 2012

(86) PCT No.: PCT/US2012/037329
§ 371 (c)(1),
(2), (4) Date: Jan. 16, 2014

(87) PCT Pub. No.: WO2013/169258
PCT Pub. Date: Nov. 14, 2013

(65) Prior Publication Data
US 2014/0153568 A1    Jun. 5, 2014

(51) Int. Cl.
*H04L 12/717* (2013.01)
*H04L 5/00* (2006.01)
*H04L 12/931* (2013.01)
*H04L 12/721* (2013.01)

(52) U.S. Cl.
CPC .............. *H04L 45/42* (2013.01); *H04L 5/0058* (2013.01); *H04L 49/00* (2013.01); *H04L 49/505* (2013.01); *H04L 45/38* (2013.01)

(58) Field of Classification Search
CPC . H04L 12/56; H04L 2012/56; H04L 29/0653; H04L 29/06095; H04L 49/3009; H04L 49/309; H04L 45/74; H04L 45/02; H04L 45/04; H04L 45/10; H04L 12/66; H04L 2012/46; H04L 2012/5618; H04L 12/46; H04L 49/30; H04L 2012/05; H04Q 11/0428; H04Q 11/0471
See application file for complete search history.

(56) References Cited

U.S. PATENT DOCUMENTS 6,046,890 A * 4/2000 Yamada et al. ............... 360/323
7,310,480 B2   12/2007 Maciocco et al.
(Continued)

OTHER PUBLICATIONS

International Search Report and Written Opinion received for PCT application No. PCT/US2012/037329, mailed on Feb. 14, 2013, 11 Pages.
(Continued)

*Primary Examiner* — Warner Wong
(74) *Attorney, Agent, or Firm* — Grossman, Tucker, Perreault & Pfleger, PLLC (57) ABSTRACT

A system for network routing based on resource availability. A network switching element (NSE) may be configured to provide status information to a controller. The controller may be configured to utilize the status information in determining control information that may be provided to the NSE. The NSE may further be configured to assign processing of information flows to processors in the NSE based on the control information. For example, the control information may contain minimum and maximum percent utilization levels for the processors. Information flows may be reassigned to processors that have available processing capacity from processors whose operation is determined not to be in compliance with the minimum and maximum levels. Moreover, inactive processors may be deactivated and alerts may be sent to the controller when the NSE determines that no available processing capacity exists to reassign the flows of processors whose operation is determined to be noncompliant.

24 Claims, 8 Drawing Sheets

(56) References Cited

U.S. PATENT DOCUMENTS

| | | | |
|---|---|---|---|
| 7,369,557 B1* | 5/2008 | Sinha | 370/392 |
| 8,089,866 B2 | 1/2012 | Smith et al. | |
| 8,155,030 B2 | 4/2012 | Farkas et al. | |
| 8,175,009 B2 | 5/2012 | Tallet et al. | |
| 8,325,630 B2 | 12/2012 | Khan et al. | |
| 8,438,305 B2 | 5/2013 | Ashwood Smith | |
| 8,509,075 B2 | 8/2013 | Eswaran et al. | |
| 8,553,566 B2 | 10/2013 | Yi et al. | |
| 8,625,466 B2 | 1/2014 | Miller | |
| 8,630,303 B2 | 1/2014 | Khan et al. | |
| 8,811,208 B2* | 8/2014 | Johnsson et al. | 370/252 |
| 2002/0027887 A1 | 3/2002 | Moriya | |
| 2002/0136202 A1* | 9/2002 | Droz et al. | 370/352 |
| 2003/0126297 A1* | 7/2003 | Olarig et al. | 709/250 |
| 2003/0235158 A1 | 12/2003 | Lee et al. | |
| 2004/0156313 A1 | 8/2004 | Hofmeister et al. | |
| 2005/0074001 A1* | 4/2005 | Mattes et al. | 370/389 |
| 2005/0254448 A1 | 11/2005 | Tang et al. | |
| 2006/0109801 A1 | 5/2006 | Ashwood Smith | |
| 2006/0182135 A1* | 8/2006 | Pisek | 370/406 |
| 2006/0250961 A1* | 11/2006 | Vasseur | H04L 12/5695 370/235 |
| 2007/0002738 A1 | 1/2007 | McGee | |
| 2008/0002681 A1 | 1/2008 | Bajic et al. | |
| 2009/0067431 A1* | 3/2009 | Huang et al. | 370/394 |
| 2009/0129271 A1* | 5/2009 | Ramankutty | H04L 12/66 370/235 |
| 2010/0020726 A1 | 1/2010 | Chu et al. | |
| 2011/0222440 A1 | 9/2011 | Phillips et al. | |
| 2011/0310894 A1* | 12/2011 | Karino | 370/389 |
| 2011/0317559 A1 | 12/2011 | Kern et al. | |
| 2012/0020361 A1 | 1/2012 | Ueno | |
| 2012/0113871 A1 | 5/2012 | Bulusu | |
| 2013/0039204 A1* | 2/2013 | Dorize et al. | 370/252 |
| 2013/0301475 A1 | 11/2013 | Gasparakis | |
| 2013/0343229 A1 | 12/2013 | Garparakis et al. | |
| 2014/0025823 A1* | 1/2014 | Szabo et al. | 709/226 |
| 2014/0258541 A1* | 9/2014 | Di Benedetto | H04L 12/6418 709/226 |

OTHER PUBLICATIONS

International Search Report and Written Opinion received for Patent Application No. PCT/US2013/044618, mailed on Nov. 13, 2013, 13 Pages.

U.S. Appl. No. 13/590,631, filed Aug. 21, 2012.

IP Precedence, TOS, & DSCP, received on Apr. 4, 2013, 3 pages.

OpenFlow Switch Specification, Version 1.1.0 Implemented ( Wire Protocol 0x02 ), Feb. 28, 2011, 56 pages.

Nichols, et al., "Definition of the Differentiated Services Field (DS Field) in the IPv4 and IPv6 Headers", Network Working Group, Request for Comments: 2474, Dec. 1998, 18 pages.

International Preliminary Report on Patentability and Written Opinion received for PCT Patent Application No. PCT/US2012/037329, mailed on Nov. 20, 2014, 8 pages.

International Preliminary Report on Patentability and Written Opinion received for PCT Patent Application No. PCT/US2013/044618, mailed on Jan. 8, 2015, 10 pages.

RFC: 791, "Internet Protocol", DARPA Internet Program, Protocol Specification, Sep. 1981, 45 pages.

Wikipedia, "Resource Reservation Protocol, Wikipedia, the free encyclopedia, retrieved on May 31, 2013, 6 pages. retrieved from" http://en.wikipedia.org/wiki/ Resource_Reservation_Protocol.

* cited by examiner

NETWORK ROUTING BASED ON RESOURCE AVAILABILITY

BACKGROUND

Electronic communication is becoming increasingly necessary for everyday interactions. Regardless of the location, users may need to connect to networks including local-area networks (LANs) or wide-area networks (WANs) like the Internet to transmit and receive data, to conduct voice or video conferencing, etc. Moreover, devices that did not typically include the ability to communicate electronically (e.g., appliances, vehicles, utility meters, security and other types of monitoring systems, etc.) are becoming communication-enabled and have started contributing to network traffic flow. The resulting burden on network infrastructure may become problematic when, for example, the amount of information to be conveyed spikes (e.g., during core business hours, during emergencies, etc.) creating high traffic situations that existing routing technology was not designed to handle, causing communication delays and low quality of service for users.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

Generally, this disclosure describes systems and methods for network routing based on resource availability. Networks, as referred to herein, may include any packet-switched network such as, for example, Ethernet networks as set forth in the IEEE 802.3 standard. Embodiments may further employ a software-based switching system designed to interact with features already present in existing network devices to control information routing in packet-switched networks. OpenFlow, as set forth in the OpenFlow Switch Specification Version 1.1.0 Implemented (Wire Protocol 0x02) dated Feb. 28, 2011, is an example of a software-based switching system that was developed for operation on packet-switched networks like Ethernet. OpenFlow may interact using features common to network devices that are not manufacturer-specific (e.g., internal flow tables) to provide controlled switching at substantially normal operational speeds. In particular, OpenFlow provides a secure interface for controlling the information routing behavior of various commercial Ethernet switches, or similar network devices, regardless of the device manufacturer. Any reference to OpenFlow in the following disclosure is meant only for the sake of explanation herein, and is not intended to limit the various embodiments to implementation only through use of OpenFlow. On the contrary, the various embodiments may be implemented with any software and/or hardware-based solution configured to provide flow control in a packet-switched network. For example, the various embodiments, as disclosed herein, would be readily applicable to any interconnected communication system having high data throughput. Peripheral component interconnect express (PCIe) is an example of a board-level interconnected communication system where interconnected components may exchange data in high speeds, and the benefits of flow control consistent with the present disclosure would be apparent. Moreover, a traffic light network may also take advantage of the disclosed embodiments, wherein each traffic light may include a sensor reporting the number of cars, traffic density, etc. to a centralized controller, and the controller would make decisions as to how the traffic lights signal the traffic to stop and go.

In one embodiment, a controller may be configured to interact with a network switching element (NSE) to control routing in a network. A controller may be, for example, a computing device configured to control the operation of the NSE by at least providing control information to the NSE. The NSE may be, for example, a software-based switch configured to control the operation of a network device. The NSE may be configured to interact with existing features of the network device such as, for example, a flow-table, to control how processors in the network device process information flows between ports also in the network device. In one embodiment, the NSE may be configured to provide status information to the controller. The controller may then be configured to use the status information in determining control information, and further, to provide the control information to the NSE. The NSE may then be configured to utilize the control information for assigning processors to process information flows between the ports.

In one embodiment, status information may include, for example, capability information and/or utilization information for the processors in the NSE. The status information may be used by the controller for determining control information including, for example, a minimum and/or maximum utilization level for the processors in the NSE. The control information may be used by the NSE to assign processors to process information flows. For example, at least one of the processors in the NSE may be configured to control the remaining processors, and in this regard may monitor the remaining processors to ensure compliance with the control information. If it is determined that a processor does not comply with the control information (e.g., the processor's utilization is below the minimum level or above the maximum level), information flows may be reassigned to other processors in order to bring the noncompliant processors into compliance.

In the same or a different embodiment, further control may be implemented in the NSE, wherein processors may be deactivated (e.g., to save power) if they are not currently processing information flows. For example, in instances where processors in the NSE are determined to be operating at a level below the minimum utilization level set forth in the control information, the information flows of the non-compliant processors may be reassigned to other processors with available processing capacity, and any inactive processors may be deactivated. Further, if it is determined that any of the processors in the NSE are operating above the maximum utilization level set forth in the control information, and that no other processors have available processing capacity to accept information flows, then the NSE may send an alert to the controller, the alert advising the controller that the processors are not in compliance and that no processing capacity is available to reallocate information flows. The controller may then be configured to resolve the "overload" condition by, for example, directing information flows away from the NSE that sent the alert (e.g., to other NSEs having available processing capacity based on its awareness of the topology of the NSEs it is controlling).

Figure 1:
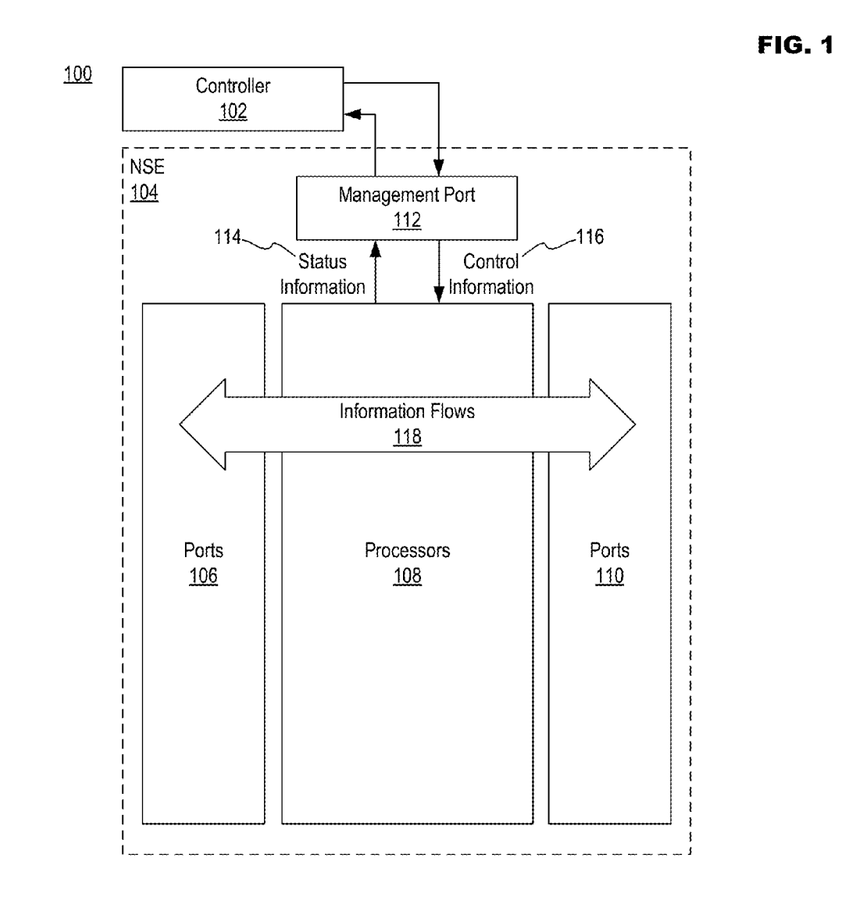
FIG. 1 illustrates an example system configured for network routing based on resource availability in accordance with at least one embodiment of the present disclosure.

FIG. 1 illustrates example system 100 configured for network routing based on resource availability in accordance with at least one embodiment of the present disclosure. System 100 may comprise a controller 102 and at least one NSE 104 (e.g., it is possible for controller 102 to control more than one NSE 104). Controller 102 may be any computing device capable of wired or wireless communication including, for example, mobile communication devices such as a smartphone based on the Android® operating system (OS), iOS®, Blackberry® OS, Palm® OS, Symbian® OS, etc., mobile computing devices such as a tablet computer like an Ipad®, Galaxy Tab®, Kindle Fire®, etc., an Ultrabook® including a low-power chipset manufactured by Intel Corp., a netbook, a notebook computer, a laptop computer, stationary computing devices such as a desktop computer, a network server, etc. In one embodiment, controller 102 may also be part of a set of distributed controllers 102. NSE 104 may be a software-based switch configured to interact with any of the example devices mentioned in regard to controller 102 above, but may further be able to utilize devices dedicated to supporting communications on a packet-switched network such as a network switch, router, gateway or other similar network-specific device.

NSE 104 may include ports 106, processors 108, ports 110 and management port 112. In instances where Openflow is being employed, the OF-CONFIG protocol may be utilized to associate OpenFlow-related resources in a physical device (e.g., ports 106, processors 108 and ports 110) with a software-based switch such as, for example, NSE 104. OFCONFIG does not determine how the resources will be assigned in the device. OF-CONFIG merely associates the device resources and allows the software-based switch (e.g., NSE 104) to have control over how the resources will be utilized. Ports 106 and Ports 110 may be application-specific or process-specific addressable locations in NSE 104 from which information flows 118 (e.g., at least one digital data transmission unit such as a packet, frame, etc.) may originate, or alternatively, to which information flows 118 may be delivered. Processors 108 may include at least one processor (e.g., processing units, processing cores, etc.) configured to process information flows 118. Processing information flows 118 may include conveying information flows 118 from ports 106 to 110, and conversely, from ports 110 to 106. Management port 112 may be configured to allow controller 102 to communicate with NSE 104. Management port 112 may include a secure channel, such as in instances where OpenFlow is being employed, over which controller 102 and NSE 104 may communicate. In one embodiment, NSE 104 may transmit status information 112 to controller 102 via management port 112, and may further receive control information from controller 102 via management port 112. Status information 114 may include, but it not limited to, capability information and/or utilization information for processors 108. For example, capability information may include, but is not limited to, the total number of processors 108, a type (e.g., manufacturer, model, category, technology, etc.) for processors 108, a speed for processors 108, a maximum throughput (e.g., bandwidth) for processors 108, etc. Utilization information may include, but is not limited to, current statistics corresponding to processors 108 and/or ports 106/110 such as, for example, percent utilization of processors 108, frames per second (fps) per processor 108 and/or port 106/110, dropped frames per processor 108 or port 106/110, etc. Control information 116 may include, but is not limited to, permitted operating conditions for processors 108 such as, for example, a permitted percent utilization level for processors 108 including a maximum usage level and/or minimum usage level, a maximum/minimum fps for processors 108, etc. A minimum permitted usage level may prompt information flow reassignment and deactivation of underutilized processors 108, which may reduce energy consumption and allow the deactivated processors 108 to be freed up for other tasks (e.g., in the instance that the device being controlled by NSE 104 is not simply a dedicated network device). A maximum permitted usage level for processors 108 may result in better per-processor performance, and thus, improved overall performance and quality of service.

Figure 2:
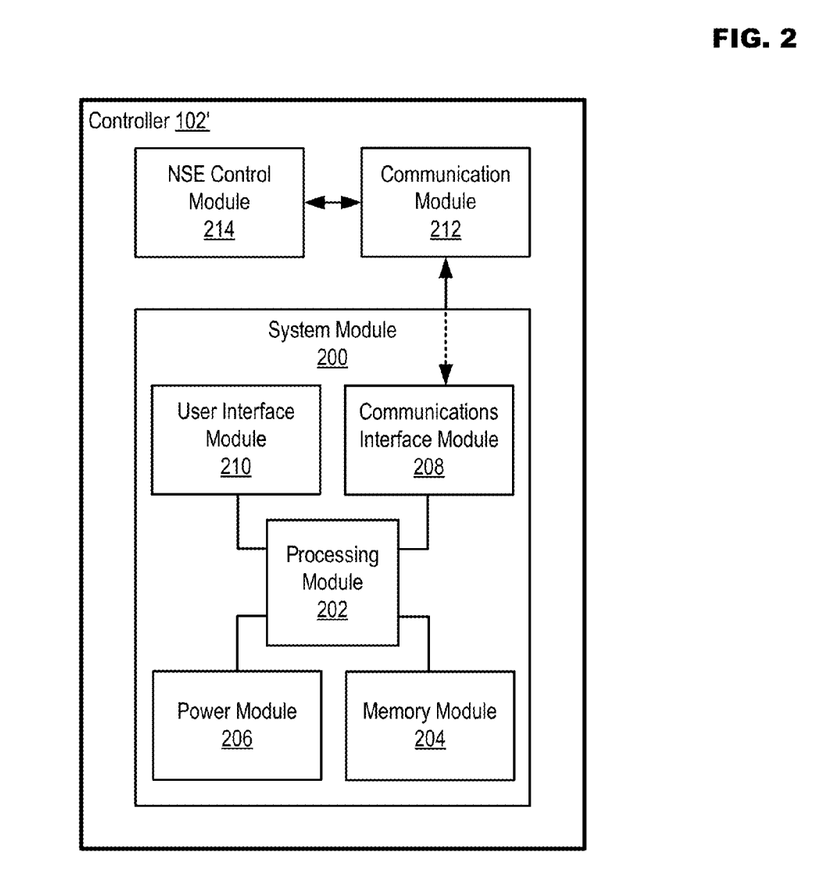
FIG. 2 illustrates an example controller in accordance with at least one embodiment of the present disclosure.

FIG. 2 illustrates example controller 102' in accordance with at least one embodiment of the present disclosure. Generally, controller 102' may include circuitry capable of implementing the functionality illustrated in FIG. 1. System module 200 may be configured to perform various functions that may occur during normal operation of controller 102'. For example, processing module 202 may comprise one or more processors situated in separate components, or alternatively, may comprise one or more processing cores situated in a single component (e.g., in a System-on-a-Chip (SOC) configuration). Example processors may include, but are not limited to, various x86-based microprocessors available from the Intel Corporation including those in the Pentium, Xeon, Itanium, Celeron, Atom, Core i-series product families. Processing module 202 may be configured to execute instructions in controller 102'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) or read-only memory (ROM) in a fixed or removable format. RAM may include memory configured to hold information during the operation of controller 102' such as, for example, static RAM (SRAM) or Dynamic RAM (DRAM). ROM may include memories such as bios memory configured to provide instructions when device 102' activates, programmable memories such as electronic programmable ROMs, (EPROMS), Flash, etc. Other fixed and/or removable memory may include magnetic memories such as floppy disks, hard drives, etc., electronic memories such as solid state flash memory (e.g., eMMC, etc.), removable memory cards or sticks (e.g., uSD, USB, etc.), optical memories such as compact disc-based ROM (CD-ROM), etc. Power module 206 may include internal (e.g., battery) and/or external (e.g., wall plug) power sources and module configured to supply controller 102' with the power needed to operate. Communications interface module 208 may be configured to handle packet routing and various control functions for communication module 212, which may include various resources for conducting wired and/or wireless communications. Wired communications may include mediums such as, for example, Universal Serial Bus (USB), Ethernet, etc. Wireless communications may include, for example, close-proximity wireless mediums (e.g., radio frequency (RF), infrared (IR), etc.), short-range wireless mediums (e.g., Bluetooth, wireless local area networking (WLAN), etc.) and long range wireless mediums (e.g., cellular, satellite, etc.). For example, communications interface module 208 may be configured to prevent wireless communications active in communication module 212 from interfering with each other. In performing this function, communications interface module 208 may schedule activities for communication module 212 based on the relative priority of pending communications. User interface module 210 may include circuitry configured to allow a user to interact with controller 102' such as, for example, various input mechanisms (e.g., microphones, switches, buttons, knobs, keyboards, speakers, touch-sensitive surfaces, one or more sensors configured to capture images and/or sense proximity, distance, motion, gestures, etc.) and output mechanisms (e.g., speakers, displays, indicators, electromechanical components for vibration, motion, etc.).

In one embodiment, NSE control module 214 may be configured to interact with at least communication module 212. Interaction may include NSE control module 214 being configured to receive status information via communication module 212, to determine control information based on the status information, and to cause communication module 212 to transmit the control information to NSE 104. NSE control module 214 may perform these actions as needed (e.g., in response to receiving status information from NSE 104), on a fixed timeframe (e.g., NSE control module 214 may cause communication module 212 to periodically transmit requests for status information to NSE 104), in response to sensed changes in system 100, etc.

Figure 3:
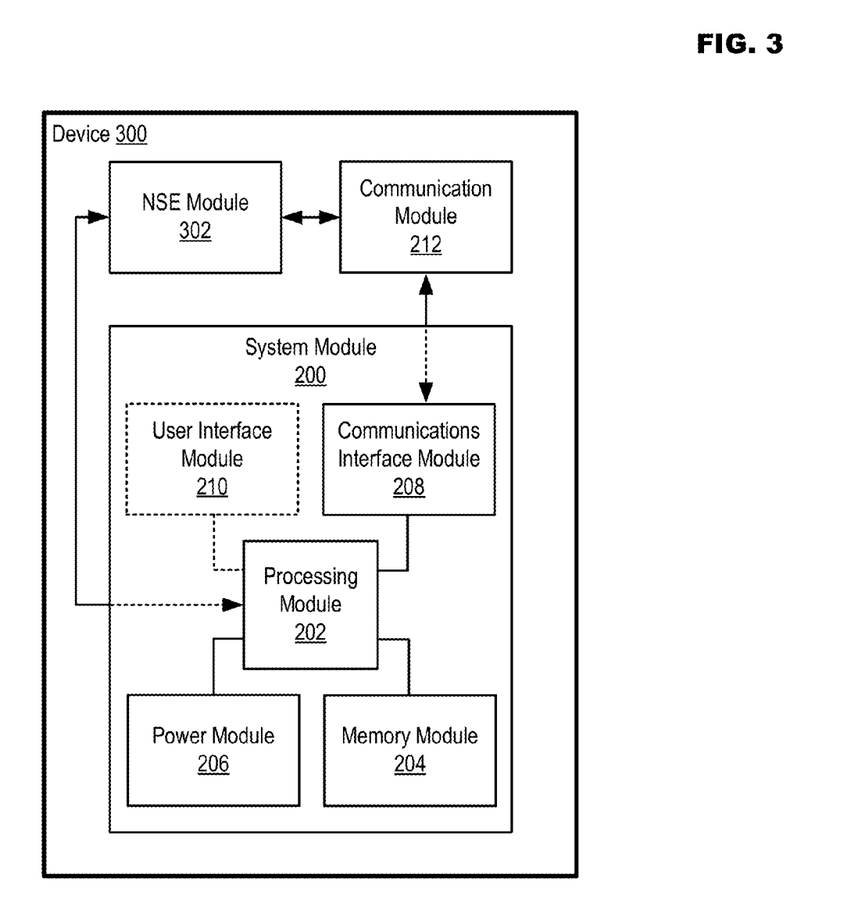
FIG. 3 illustrates an example device that a network switching element may utilize to operate in accordance with at least one embodiment of the present disclosure.

FIG. 3 illustrates example device 300 that NSE 104 may utilize to operate in accordance with at least one embodiment of the present disclosure. In particular, when OpenFlow or another similar software-based switching system is employed to implement a system concurrent with the disclosed embodiments, NSE 104 may comprise a software-based switch configured to control the behavior of a communication-enabled device (e.g., device 300). For example, the software-based switch may access existing features of device 300 (e.g., a flow-table in Ethernet-based devices) in order control how processors in device 300 process information flows between ports.

As illustrated in FIG. 3, device 300 may include similar modules to those discussed in regard to controller 102' in FIG. 2. However, at least two differences that may exist include user interface module 210 being optional and NSE module 302 replacing NSE control module 214. User interface module 210 may be optional (or rudimentary) if, for example, device 300 is not a full-fledged computing device as discussed above in regard to FIG. 1, but instead is a dedicated networking device such as a switch, router, gateway, etc. NSE module 302 may be configured to interact with at least processing module 202 and communication module 212 in device 300. For example, NSE module 302 may cause communication module 212 to transmit status information to controller 102, and may receive control information from controller 102 via communication module 212. NSE module 302 may interact with processing module 302 in order to control how processors in processing module 202 (e.g., corresponding to processors 108 in NSE 104) process information flows (e.g., corresponding to information flows 118 in NSE 104) between ports (e.g., corresponding to ports 106 and 110 in NSE 104) in device 300. For example, device 300 may be a computing device (e.g., a desktop computer) and processing module 202 may comprise a processor integrated circuit (IC) including multiple processing cores (e.g., four cores). NSE module 302 may then cause one of the processing cores to run an NSE operating system (OS) software causing the processing core to control how the other three cores process information flows in device 300.

Figure 4:
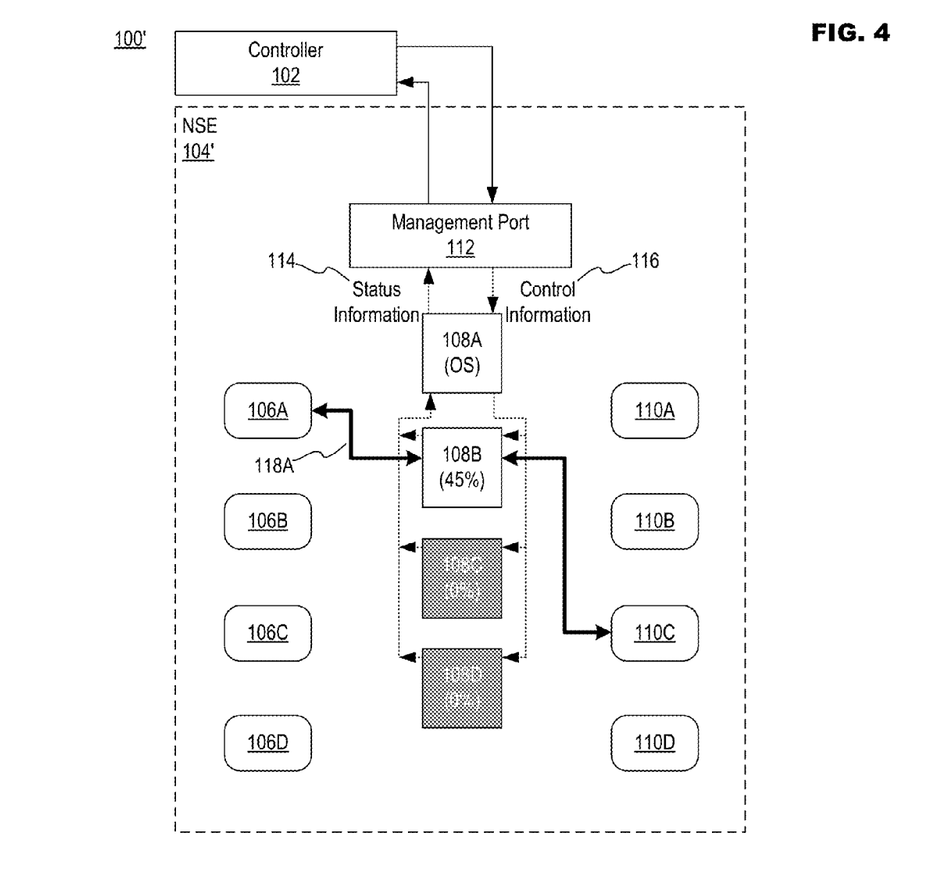
FIG. 4 illustrates an example of information flow assignment including a controller and network switching element in accordance with at least one embodiment of the present disclosure.

FIG. 4 illustrates an example of information flow assignment including controller 102 and NSE 104' in accordance with at least one embodiment of the present disclosure. In system 100' controller 102 may control the operation of NSE 104' by at least providing control information to NSE 104'. NSE 104' may comprise at least ports 106A, 106B, 106C and 106D (collectively ports 106A-D), processors 108A, 108B, 108C and 108D (collectively processors 108A-D) and ports 110A, 110B, 110C and 110D (collectively ports 110A-D) and management port 112. Controller 102 may communicate with NSE 104' via management port 112. Processor 108A may be loaded with the NSE OS that configures processor 108A to, for example, receive status information 114 from processors 108B-D, provide status information 114 to controller 102 via management port 112, receive control information 116 from controller 102 via management port 112 and assign processors 108B-D to process information flows 118 between ports 106A-D and ports 110A-D in NSE 104' based on control information 116. For example, processor 108A may provide status information 114 to controller 102, status information 114 indicating that NSE 104' has three available processors (e.g., processors 108B-D), a processor type (e.g., processing cores in an x86-based microprocessor), the current processing load of the available processors, etc. Controller 102 may utilize status information 114 in determining control information 116. For the sake of explanation herein, control information 116 may instruct that, for example, the percent utilization level of processors 108B-D is limited to a minimum of 5% and a maximum of 80%. Controller 102 may then provide control information 116 to processor 108A, which may utilize control information 116 when assigning information flows 118 to processors 108B-D.

In the example illustrated in FIG. 4, processor 108A assigns processor 108B to process first information flow 118A between port 106A and 110 C. Processing first information flow 118A causes processor 108B to have a 45% utilization level, which complies with the example minimum and maximum percent utilization levels in control information 116. Processors 108C and 108D are inactive (e.g., 0% utilization level), and thus, have been deactivated as indicated by these processors being grayed-out. As a result, all active processors (e.g., processor 108B in FIG. 4) are in compliance, and processor 108A does not need to reassign information flows 118.

Figure 5:
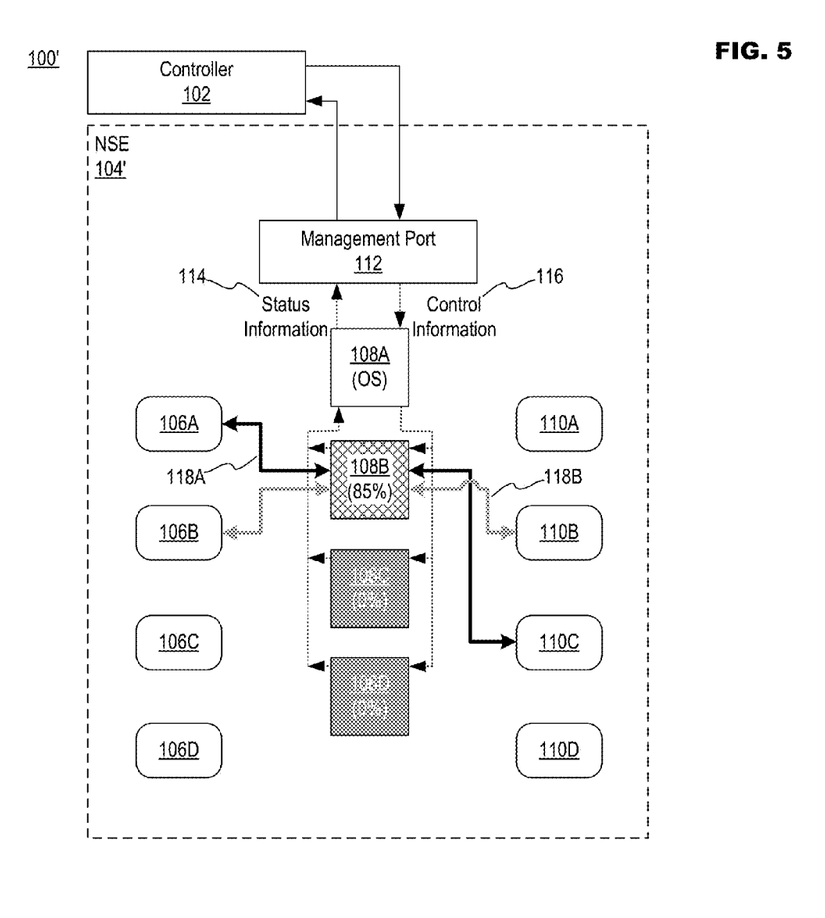
FIG. 5 illustrates an example of the operation of a processor in a network switching element not being in compliance with control information in accordance with at least one embodiment of the present disclosure.
Figure 6:
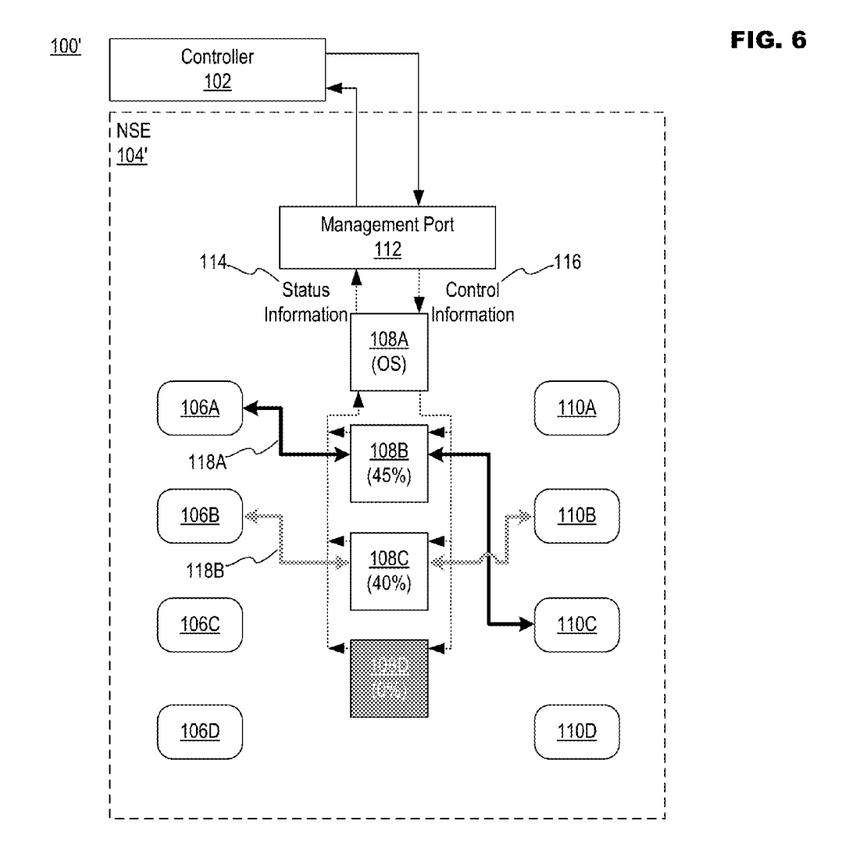
FIG. 6 illustrates an example of reassigning an information flow to bring the operation of a processor in a network switching into compliance with control information in accordance with at least one embodiment of the present disclosure.

FIG. 5 proceeds to build upon the example illustrated in FIG. 4 by introducing a second information flow 118B between ports 106B and 110B of NSE 104'. Second information flow 118B may, at least initially, be assigned to processor 108B (e.g., since it is actively processing first information flow 118A). Processor 108A may then become aware (e.g., based on status information 114 received from processor 108B) that the operation of processor 108B is not in compliance with the 80% maximum utilization level set forth in control information 116 because the percent utilization level of processor 108B has risen to 85%. To bring the operation of processor 108B back into compliance with control information 116, in FIG. 6 processor 108A may activate processor 108C and may then assign second information flow 118B to processor 108C. As a result of the reassignment, the percent utilization of processor 108B may drop back down to 45% and the percent utilization of processor 108C may rise to 45%, allowing the operation of both processors 108B and 108C to be in compliance with control information 116.

Figure 7:
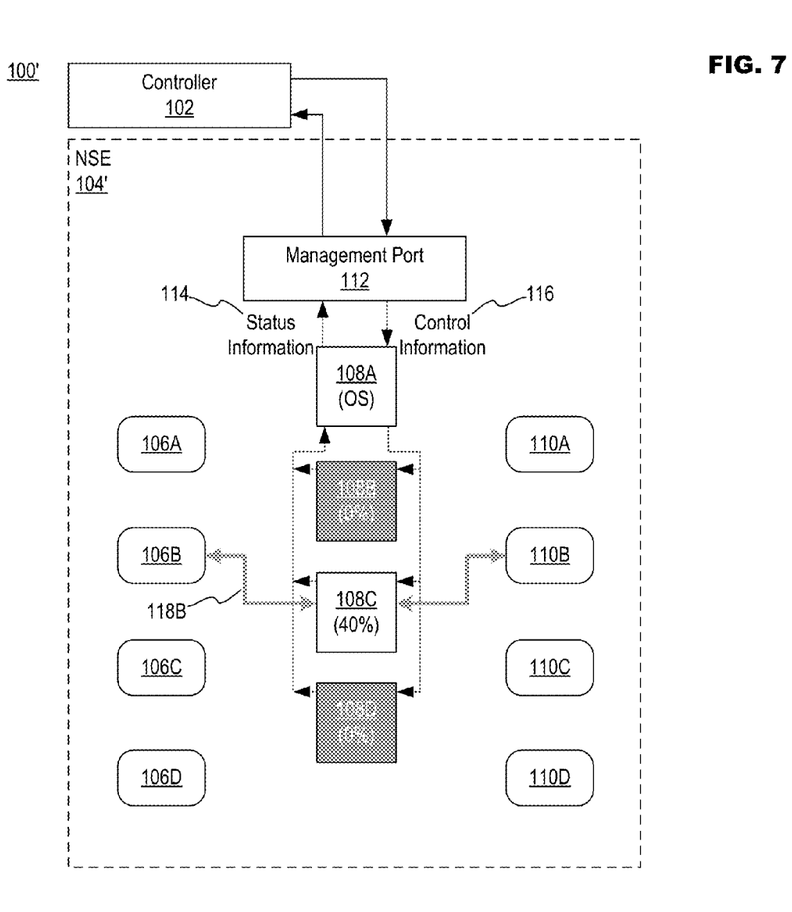
FIG. 7 illustrates an example of disabling inactive processors in a network switching element in accordance with at least one embodiment of the present disclosure.

In FIG. 7, first information flow 118A is discontinued (e.g., due to completion, being cut off, etc.). In one embodiment, if processor 108B was still actively processing other information flows 118, but the percent utilization level of processor 108B was below the minimum set forth in control information 116 (e.g., 5%), then processor 108A may reassign the other information flows 118 to another active processor with capacity such as, for example, processor 108C. Once processor 108B becomes totally inactive, processor 108A may deactivate processor 108 B to, for example, conserve energy, free up processor 108A to perform other tasks, etc. While not shown in FIG. 4-7, situations may occur where the operation of one or more processors 108B-D are not in compliance with control information 116, but none of processors 108B-D have any available processing capacity to balance out the processing load. In one embodiment, this situation may cause processor 108A to alert controller 102 (e.g., via management port 112). Controller 102 may then attempt to direct information flows 118 away from NSE 104' (e.g., to another NSE) to reduce the processing load for NSE 104', which may allow processor 108A to reassign one or more information flows 118 and bring the operation of processors 108B-D into compliance.

Figure 8:
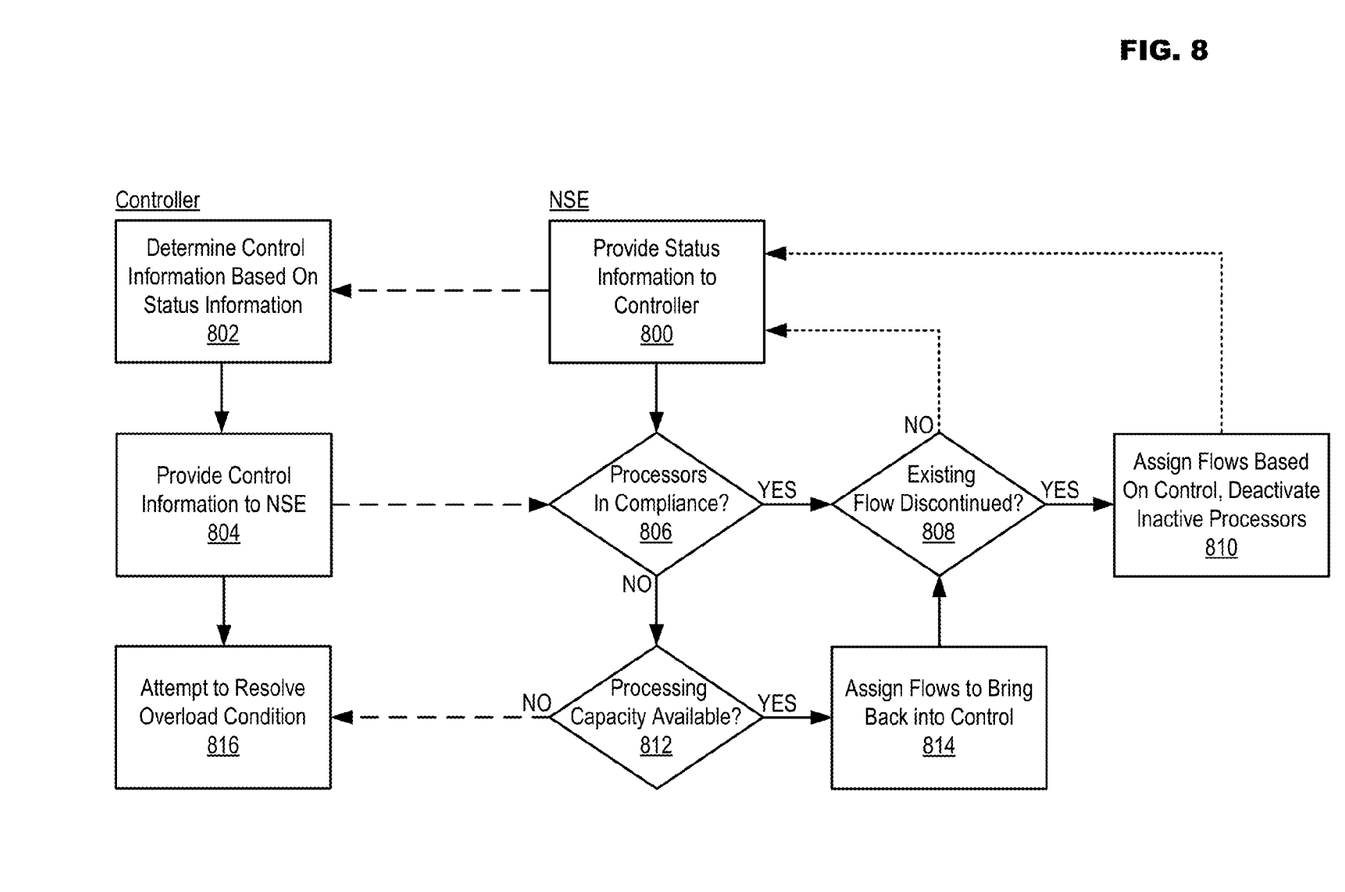
FIG. 8 illustrates flowcharts of example operations for network routing based on resource availability in accordance with at least one embodiment of the present disclosure.

FIG. 8 illustrates flowcharts of example operations for network routing based on resource availability in accordance with at least one embodiment of the present disclosure. In particular, operations 802, 804 and 816 may occur in a controller, while operations 800, 806, 808, 810, 812 and 814 may occur in an NSE. In operation 800 the NSE may provide status information to the controller. In one embodiment, the status information may include at least one of capability information or utilization information for processors in the NSE. After receiving the status information from the NSE, controller may determine control information in operation 802. Control information may include at least one of a minimum utilization level or a maximum utilization level for the processors based on the status information. The control information may then be provided to the NSE in operation 804.

A determination may then be made in operation 806 as to whether the operation of the processors in the NSE is in compliance with the control information. If in operation 806 it is determined that the operation of the processors is in compliance with the control information, then in operation 808 a further determination may be made as to whether any existing communication flows have been discontinued due to, for example, the communication flows being complete, interrupted, etc. If in operation 808 it is determined that any of the existing communication flows have been discontinued, then in operation 810 any remaining flows for processors whose operation is determined to be below the minimum allowed utilization level may be assigned to other processors, and any processors that are inactive may be deactivated. Per the dotted arrows illustrated in FIG. 8, if in operation 808 it is determined that no existing flows have been discontinued, or following any reassignments or deactivations take place in operation 810, it may be optional to return to operation 800 where the NSE may again provide the status information to the controller. The return to operation 800 may occur if, for example, the system is configured to continually provide updated status information to the controller.

If in operation 806 it is determined that the operation of any of the processors is not in compliance with the control information (e.g., the percent utilization of any of the processors is above the maximum utilization level set forth in the control information), then in operation 812 a further determination may be made as to whether any of the processors have processing capacity available to, for example, reassign information flows from the noncompliant processors. If in operation 812 it is determined that processing capacity is available, then in operation 814 one or more information flows may be assigned to bring the operation of the noncompliance processors back into compliance. For example, one or more information flows may be reassigned from the noncompliant processors to the processors having processing capacity available. If, on the other hand, in operation 812 it is determined that no processors have processing capacity available, then an alert may be transmitted from the NSE to the controller. In one embodiment, the NSE may continue to attempt information flow reassignment after the alert is sent to the controller because conditions in the NSE may change (e.g., an existing information flow may complete), resulting in available processing capacity in the NSE usable for information flow reassignment. In operation 816 the controller may then attempt to resolve the overload condition. For example, the controller may direct one or more information flows away from the NSE (e.g., to another NSE) to reduce the processing burden of the overloaded NSE.

In one embodiment, the system may not be configured to continually provide updated status information to the controller (e.g., to return to operation 800 as illustrated in FIG. 8). In such a configuration, operations 808 or 810 may instead be followed by, for example, a return to operation 806 wherein monitoring the processors may be continued since other conditions may arise in the NSE requiring information flow reassignment (e.g., such as a software thread running in the NSE that starts to aggressively consume resources, pushing at least one processor out of compliance). As a result, the NSE may continue to reassign information flows from processors operating above the maximum utilization level to processors with available processing capacity (e.g., steps 806, 812 and 814), and may reassign information flows from processors operating below the minimum utilization level to processors with available processing capacity, possibly along with deactivating any inactive processors (e.g., steps 808 and 810), until, for example, a situation arises where reassignment is impossible (e.g., due to no available processing capacity being available such as described above). In the same or a different embodiment, the NSE may also notify the controller whenever it changes configuration (e.g., whenever information flows are reassigned and/or discontinued, whenever processors are activated or deactivated, etc.)

Further embodiments consistent with the present disclosure may, for example, vary the manner in which control is allocated between controller and NSE. While the controller may be configured to provide at least control information to the NSE, allowing the NSE to control how information flows are assigned to its processors, in one embodiment the controller may also be configured to orchestrate some or all of the control over how information flows are assigned to the processors in the NSE. For example, the controller may receive status information from the NSE as described above, but may then utilize the status information for generating instructions for controlling how the NSE assigns information flows. The system may also operate in a mode wherein the NSE provides alerts to the controller in certain situations beyond the examples that were described above (e.g., when the average processor usage is below or above a certain level, when a certain number of information flows are active in the NSE, etc.) and the controller may then have the opportunity to intervene in the operation of the NSE, possibly in combination with other NSEs also in the topology controlled by the controller, to balance system-wide flow traffic.

While FIG. 8 illustrates various operations according to an embodiment, it is to be understood that not all of the operations depicted in FIG. 8 are necessary for other embodiments. Indeed, it is fully contemplated herein that in other embodiments of the present disclosure, the operations depicted in FIG. 8, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure provides systems and methods for network routing based on resource availability. A network switching element (NSE) may be configured to provide status information to a controller. The controller may be configured to utilize the status information in determining control information that may be provided to the NSE. The NSE may be further configured to assign processing of information flows to processors in the NSE based on the control information. For example, the control information may contain minimum and maximum percent utilization levels for the processors. Information flows may be reassigned to processors that have available processing capacity from processors whose operation is determined not to be in compliance with the minimum and maximum levels. Moreover, inactive processors may be deactivated and alerts may be sent to the controller when the NSE determines that no available processing capacity exists to reassign the flows of processors whose operation is determined to be noncompliant.

The following examples pertain to further embodiments. In one example embodiment there is provided a system. The system may include a network switching element including at least ports and processors, the network switching element being configured to assign at least one of the processors to process information flows between the ports based on control information, and a controller configured to control the network switching element by providing the control information to the network switching element.

The above example system may be further configured, wherein the network switching element comprises a software-based switch configured to control operation of a device comprising the ports and processors. In this configuration the example system may be further configured, wherein the software-based switch is configured to interact with a flow table in the device, the flow table defining how information will be routed in an Ethernet network based on the IEEE 802.3 standard.

The above example system may be further configured, wherein the control information comprises at least one of a minimum utilization level or a maximum utilization level for the processors.

The above example system may be further configured, wherein the processors comprise at least one processor configured to assign the processing of the information flows based on the control information. In this configuration the example system may be further configured, wherein the at least one processor is further configured to provide information regarding status of the processors to the controller. In this configuration the example system may be further configured, wherein the controller is configured to determine the control information based on the status information received from the at least one controller.

In another example embodiment there is presented a controller. The controller may include a communication module configured to communicate on a network, and a network switching element control module configured to receive status information from a network switching element via the communication module, to determine control information based on the status information, and to provide the control information to the network switching element via the communication module.

The above example controller may be further configured, wherein the status information includes at least one of capability information or utilization information for processors in the network switching element. In this configuration the example controller may be further configured, wherein the control information includes at least one of a minimum utilization level or a maximum utilization level for the processors. In this configuration the example controller may be further configured, wherein the network switching element control module is further configured to receive an alert from the network switching element via the communication module, the alert indicating that at least one of the processors is exceeding the maximum utilization level, and to redirect information flows away from the network switching element based on the alert.

In another example embodiment there is presented a device. The device may include a communication module configured to communicate on a network, ports configured to transmit and receive information flows, processors configured to process the information flows between the ports, and a network switching element module configured to provide status information to a controller via the communication module, to receive control information from the controller via the communication module, and to assign at least one of the processors to process the information flows between the ports based on the control information.

The above example device may be further configured, wherein the network switching element module is configured to interact with a flow table in the device, the flow table defining how information will be routed in an Ethernet network in accordance with the IEEE 802.3 standard.

The above example device may be further configured, wherein the status information includes at least one of capability information or utilization information for processors in the network switching element.

The above example device may be further configured, wherein the control information comprises at least one of a minimum utilization level or a maximum utilization level for the processors based on the status information.

In another example embodiment there is presented a method. The method may include receiving status information from a network switching entity, determining control information based on the status information, and transmitting the control information to the network switching entity.

The above example method may be further configured, wherein the status information includes at least one of capability information or utilization information for processors in the network switching element.

The above example method may be further configured, wherein determining control information includes determining at least one of minimum utilization level or a maximum utilization level for the processors.

In this configuration the above example method may further comprise receiving an alert that at least one of the processors in the network switching element is exceeding the maximum utilization level from the network switching element, and redirecting information flows away from the switching element based on the alert.

In another example embodiment there is presented a method. The method may include providing status information to a controller, receiving control information from the controller, determining whether processors are operating in compliance with the control information, and controlling the processing of information flows between ports so that the operation of the processors complies with the control information.

The above example method may be further configured, wherein the control information comprises at least one of a minimum utilization level or a maximum utilization level for the processors based on the status information.

The above example method may be further configured, wherein controlling the processing of information flows comprises determining if any processors have available processing capacity, and reallocating information flows from processors determined not to be operating in compliance with the control information to processors determined to have available processing capacity. In this configuration the above example method may be further configured, wherein controlling the processing of information flows comprises alerting the controller when it is determined that processors are not operating in compliance with the control information and no processors have available processing capacity. In this configuration the above example method may be further configured, wherein controlling the processing of information flows comprises determining if any information flows have been discontinued, and reallocating information flows between the processors based on the control information. In this configuration the above example method may be configured to further comprise deactivating any processors that are not processing information flows as a result of the reallocation of information flows.

In another example embodiment there is presented a system comprising at least a controller and a network switching entity, the system being arranged to perform the method of any of the above example methods.

In another example embodiment there is presented a chipset arranged to perform any of the above example methods.

In another example embodiment there is presented at least one machine readable medium comprising a plurality of instructions that, in response to be being executed on a computing device, cause the computing device to carry out any of the above example methods.

In another example embodiment there is presented a controller apparatus, the controller apparatus being arranged to perform any of the above methods pertaining to a controller apparatus.

In another example embodiment there is presented a network switching element, the network switching element being arranged to perform any of the above methods pertaining to a network switching element.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A system, comprising:
    a network switching element including at least ports and processors, the network switching element to:
    determine if any information flows have been discontinued: and
    reallocate the processing of information flows between ports of the processors based on control information; and
    a controller to control the network switching element by providing the control information to the network switching element,
    said controller is further cause said network switching element to deactivate processors that are not processing information flows as a result of the reallocation assignment of the processing of said information flows.

2. The system of claim 1, wherein the network switching element comprises a software-based switch configured to control operation of a device comprising the ports and processors.

3. The system of claim 2, wherein the software-based switch is configured to interact with a flow table in the device, the flow table defining how information will be routed in an Ethernet network based on Institute of Electrical and Electronics Engineers (IEEE) standard 802.3.

4. The system of claim 1, wherein the control information comprises at least one of a minimum utilization level or a maximum utilization level for the processors.

5. The system of claim 1, wherein the processors comprise at least one processor configured to assign the processing of the information flows based on the control information.

6. The system of claim 5, wherein the at least one processor is further configured to provide information regarding status of the processors to the controller.

7. The system of claim 6, wherein the controller is configured to determine the control information based on the status information received from the at least one controller.

8. A system, comprising:
a communication module configured to communicate on a network;
a network switching element control module to:
receive status information from a network switching element via the communication module, to determine control information based on the status information; and
provide the control information to the network switching element via the communication module; and
a network switching element including at least ports and processors, the network switching element to:
determine if any information flows have been discontinued: and
reallocate the processing of information flows between ports of the processors based on the control information
wherein:
said network switching element control module is further configured to cause said network switching element to deactivate processors that are not processing information flows as a result of the reallocation of the processing of said information flows.

9. The system of claim 8, wherein the status information includes at least one of capability information or utilization information for processors in the network switching element.

10. The system of claim 9, wherein the control information includes at least one of a minimum utilization level or a maximum utilization level for the processors.

11. The system of claim 10, wherein the network switching element control module is further configured to receive an alert from the network switching element via the communication module, the alert indicating that at least one of the processors is exceeding the maximum utilization level, and to redirect information flows away from the network switching element based on the alert.

12. A device, comprising:
a communication module configured to communicate on a network;
configured to transmit and receive information flows;
processors configured to process the information flows between the ports; and
a network switching element module configured to:
provide status information to a controller via the communication module;
receive control information from the controller via the communication module assign at least one of the processors to process the information flows between the ports based on the control information; and
deactivate processors that are not processing information flows as a result of the assignment of at least one of the processors to process the information flows.

13. The device of claim 12, wherein the network switching element module is configured to interact with a flow table in the device, the flow table defining how information will be routed in an Ethernet network based on Institute of Electrical and Electronics Engineers (IEEE) standard 802.3.

14. The device of claim 12, wherein the status information includes at least one of capability information or utilization information for processors in the network switching element.

15. The device of claim 12, wherein the control information comprises at least one of a minimum utilization level or a maximum utilization level for the processors based on the status information.

16. A method, comprising:
providing status information to a controller;
receiving control information from the controller;
determining whether processors are operating in compliance with the control information;
determining if any information flows have been discontinued;
reallocating information flows between the processors based on the control information; and
deactivating processors that are not processing information flows as a result of said reallocating of the processing of said information flows.

17. The method of claim 16, wherein the control information comprises at least one of a minimum utilization level or a maximum utilization level for the processors based on the status information.

18. The method of claim 16, wherein controlling the processing of information flows comprises determining if any processors have available processing capacity, and reallocating information flows from processors determined not in compliance with the control information to processors determined to have available processing capacity.

19. The method of claim 18, wherein controlling the processing of information flows comprises alerting the controller when it is determined that processors are not in compliance with the control information and no processors have available processing capacity.

20. At least one non-transitory computer readable storage medium having stored thereon, individually or in combination, instructions that when executed by one or more processors result in the following operations comprising:
providing status information to a controller;
receiving control information from the controller;
determining whether processors are operating in compliance with the control information;
reallocating the processing of information flows between ports by said processors; and
deactivating processors that are not processing information flows as a result of said allocating of the processing of said information flows.

21. The medium of claim 20, wherein the control information comprises at least one of a minimum utilization level or a maximum utilization level for the processors based on the status information.

22. The medium of claim 20, further comprising:
determining if any processors have available processing capacity;
and reallocating information flows from processors determined not to be operating in compliance with the control information to processors determined to have available processing capacity.

23. The medium of claim 22, wherein controlling the processing of information flows comprises alerting the controller when it is determined that processors are not operating in compliance with the control information and no processors have available processing capacity.

24. The medium of claim 22, wherein said instructions when executed further result in the performance of the following operations comprising:

determining if any information flows have been discontinued; and reallocating information flows between the processors based on the control information.

* * * * *